US011860868B2

(12) United States Patent
Kaul et al.

(10) Patent No.: US 11,860,868 B2
(45) Date of Patent: Jan. 2, 2024

(54) SECURE DATABASE-AS-A-SERVICE SYSTEM

(71) Applicant: International Business Machines Corporation, Armonk, NY (US)

(72) Inventors: Akshar Kaul, Bangalore (IN); Dhinakaran Vinayagamurthy, Erode (IN); Pankaj Satyanarayan Dayama, Bangalore (IN); Santosh Ravi Kiran Penubothula, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/550,367

(22) Filed: Dec. 14, 2021

(65) Prior Publication Data

US 2023/0185800 A1    Jun. 15, 2023

(51) Int. Cl.
   *G06F 16/00*       (2019.01)
   *G06F 16/2453*     (2019.01)
   (Continued)

(52) U.S. Cl.
   CPC .... G06F 16/24534 (2019.01); G06F 16/2228 (2019.01); G06F 16/2462 (2019.01); G06F 21/6227 (2013.01); H04L 9/0618 (2013.01)

(58) Field of Classification Search
   CPC ........... G06F 16/24534; G06F 16/2228; G06F 16/2462; G06F 16/6227; G06F 16/2428;
   (Continued)

(56) References Cited

U.S. PATENT DOCUMENTS

| 9,800,558 B2 | 10/2017 | Kerschbaum |
| 10,599,719 B2 * | 3/2020 | Sirin ................ G06F 18/217 |

(Continued)

FOREIGN PATENT DOCUMENTS

| CN | 111984729 A | 11/2020 |
| CN | 112749410 A | 5/2021 |

(Continued)

OTHER PUBLICATIONS

Abhishek Sen et al., "Bit level symmetric key cryptography using genetic algorithm", 7th International Conference on Communication Systems and Network Technologies (CSNT), Nov. 2017 (pp. 193-199).*

(Continued)

*Primary Examiner* — Srirama Channavajjala
(74) *Attorney, Agent, or Firm* — Ryan, Mason & Lewis, LLP

(57) ABSTRACT

Methods, systems, and computer program products for a secure database-as-a-service are provided herein. A computer-implemented method includes obtaining, by a database service, data associated with one or more client devices to be stored in at least one encrypted database; encrypting, without mutation and in accordance with one or more security requirements, at least a portion of the data using an order preserving encryption scheme, wherein the encrypting comprises (i) computing a set of encryption parameters for the portion of the data and (ii) applying a process that converts a fixed-length cipher text corresponding to the portion of the data to a variable-length cipher text; and storing the encrypted data in the at least one encrypted database, wherein the database service enables one or more indexes to be built over the encrypted data to improve performance of query processing.

20 Claims, 7 Drawing Sheets

(51) Int. Cl.
  *G06F 16/22* (2019.01)
  *H04L 9/06* (2006.01)
  *G06F 16/2458* (2019.01)
  *G06F 21/62* (2013.01)

(58) Field of Classification Search
  CPC . G06F 21/6227; G06F 21/602; H04L 9/0618; H04L 9/3006; H04L 9/0625; H04L 9/0662
  See application file for complete search history.

(56) References Cited

U.S. PATENT DOCUMENTS

| | | | |
|---|---|---|---|
| 2005/0147246 A1* | 7/2005 | Agrawal | H04L 9/0662 380/44 |
| 2009/0214024 A1* | 8/2009 | Schneider | H04L 9/0625 380/28 |
| 2009/0310778 A1* | 12/2009 | Mueller | H04L 9/0625 380/28 |
| 2012/0204026 A1* | 8/2012 | Shi | H04L 9/3006 713/168 |
| 2013/0168450 A1* | 7/2013 | von Mueller | H04L 9/0618 235/449 |
| 2018/0060435 A1 | 3/2018 | Grubbs | |
| 2019/0013936 A1 | 1/2019 | Murray et al. | |
| 2019/0379589 A1* | 12/2019 | Ryan | G06F 17/142 |
| 2020/0266972 A1 | 8/2020 | Chakraborty | |
| 2020/0285617 A1* | 9/2020 | Tobin | G06F 16/2428 |
| 2022/0100883 A1* | 3/2022 | Leshinsky | G06F 21/602 |
| 2022/0309178 A1* | 9/2022 | Roy | G06F 21/6227 |

FOREIGN PATENT DOCUMENTS

| | | |
|---|---|---|
| WO | WO2004082147 A2 * | 9/2004 |
| WO | WO2014100788 A2 * | 6/2014 |
| WO | WO2016200461 A2 * | 12/2016 |
| WO | WO2017214060 A1 * | 12/2017 |

OTHER PUBLICATIONS

Aman Roy et al., "Advancement on Substitution Cipher using Multiple Substitution Table", 5th International Conference on Computing, Communication, Control And Automation (ICCUBEA) Sep. 2019 (pp. 1-6).*

Mell, Peter, et al., The NIST Definition of Cloud Computing, National Institute of Standards and Technology, U.S. Department of Commerce, NIST Special Publication 800-145, Sep. 2011.

Popa, Raluca Ada, et al., An ideal-security protocol for order-preserving encoding. In 2013 IEEE Symposium on Security and Privacy, May 19, 2013 (pp. 463-477).

Kerschbaum, Florian, et al. "Optimal average-complexity ideal-security order-preserving encryption." Proceedings of the 2014 ACM SIGSAC Conference on Computer and Communications Security. Nov. 3, 2014, pp. 275-286.

Gentry, Craig. "Fully homomorphic encryption using ideal lattices." Proceedings of the forty-first annual ACM symposium on Theory of computing, May 31, 2009, pp. 169-178.

Eskandarian, Saba, et al., "Oblidb: Oblivious query processing for secure databases", arXiv preprint arXiv:1710.00458. Oct. 2, 2017, pp. 169-183.

Mavroforakis, Charalampos, et al. "Modular order-preserving encryption, revisited." Proceedings of the 2015 ACM SIGMOD International Conference on Management of Data. May 27, 2015, pp. 763-777.

Shmueli, Erez, et al. "Designing secure indexes for encrypted databases." IFIP Annual Conference on Data and Applications Security and Privacy. Springer, Berlin, Heidelberg, Aug. 7, 2005, pp. 54-68.

Kamel, Ibrahim, et al., "Dynamic spatial index for efficient query processing on the cloud." Journal of Cloud Computing 6.1, Dec. 2017, pp. 1-16.

International Search Report and Written Opinion from International Application No. PCT/CN2022/134535, 9 pages, dated Feb. 10, 2023.

* cited by examiner

SECURE DATABASE-AS-A-SERVICE SYSTEM

BACKGROUND

The present application generally relates to information technology and, more particularly, to data security.

Hosted or managed services offer a number of advantages for users over traditional on-premises equivalents. DBaaS (Database-as-a-Service) is one example of a managed cloud computing service that allows users to access and use a cloud database system without the overhead that are typically required for deploying and managing an on-premises database management system.

SUMMARY

In one embodiment of the present disclosure, techniques for building a secure database-as-a-service system are provided. An exemplary computer-implemented method includes obtaining, by a database service, data associated with one or more client devices to be stored in at least one encrypted database; encrypting, without mutation and in accordance with one or more security requirements, at least a portion of the data using an order preserving encryption scheme, wherein the encrypting comprises (i) computing a set of encryption parameters for the portion of the data and (ii) applying a process that converts a fixed-length cipher text corresponding to the portion of the data to a variable-length cipher text; and storing the encrypted data in the at least one encrypted database, wherein the database service enables one or more indexes to be built over the encrypted data to improve performance of query processing.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

DBaaS involves client devices that store and manage data on a server, where the server provides the service. Typically, the server cannot be trusted, and so a trusted proxy is used to encrypt and/or decrypt the data between the client devices and the server. Existing encryption techniques for providing data confidentiality in databases with dynamic content include property-preserving encryption schemes. Such schemes enable range queries with logarithmic amortized overhead. Order-Preserving Encryption (OPE) preserves order between cipher texts, but otherwise reveal nothing else about the plaintexts. OPE is required to be stateful and also requires mutations (i.e., re-encryptions of previously encrypted data) to achieve the claimed security.

Mutations in OPE are computationally expensive because, for example, they can cause periodic re-encryption of a block of user data that already exists in a database, increase the number of reads and writes on the system, and modify user data (as opposed to just the OPE state). Mutations can also conflict with concurrent ongoing insertions (such as by blocking reads and writes on the user data being re-encrypted and increasing the number of failed transactions) and hamper throughput and latency of the system.

By way of example, a typical system using IND-OCPA (Indistinguishability under Ordered Chosen Plaintext Attack) compliant OPE generally has over three mutations per encryption. Other systems for IND-OCPA compliant OPE re-encrypt the entire database periodically to redistribute the cipher text. This translates to re-encrypting an entire column in an RDBMS (Relational Database Management System) and re-encrypting the entire database for a Key-Value (KV) store.

As described herein, an exemplary embodiment includes building a secure DBaaS that allows support for performing range queries on an encrypted database for a dynamically changing dataset and support for creating indexes over encrypted data to improve the performance of runtime processing. The secure DBaaS, in some embodiments, provides IND-OCPA security guarantees and enables mutation-less query processing with practical storage overheads. Some embodiments can include generating variable bit length cipher text from a fixed-length OPE cryptosystem. The parameters for the OPE order preserving encryption system can be dynamically changed on each call to an encrypt function, based on the implicit statistics. At least one embodiment includes performing hyper-parameter tuning based on local in-memory statistics. Multiple independent OPE instances may be used simultaneously for encrypting values belonging to a single user database column, where the number of OPE instances, theoretically in the worst case, are linear in the number of unique elements encrypted.

Figure 1:
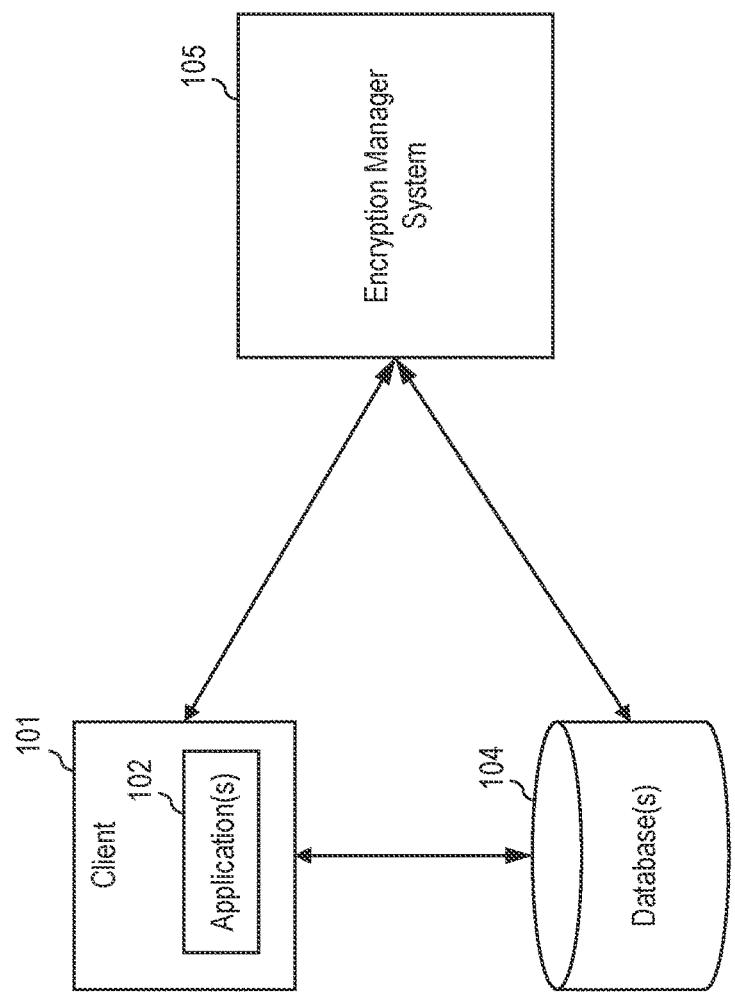
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a client 101 which is configured to execute one or more applications 102. The one or more applications 102 enable the client 101 to securely store and manage data in the one or more databases 104 based at least in part on the encryption manager system 105. For example, the one or more databases 104 and the encryption manager system 105, in at least some embodiments, are configured to use a mutation-less OPE scheme that enables variable-length cipher texts, as discussed in more detail elsewhere herein.

Figure 2:
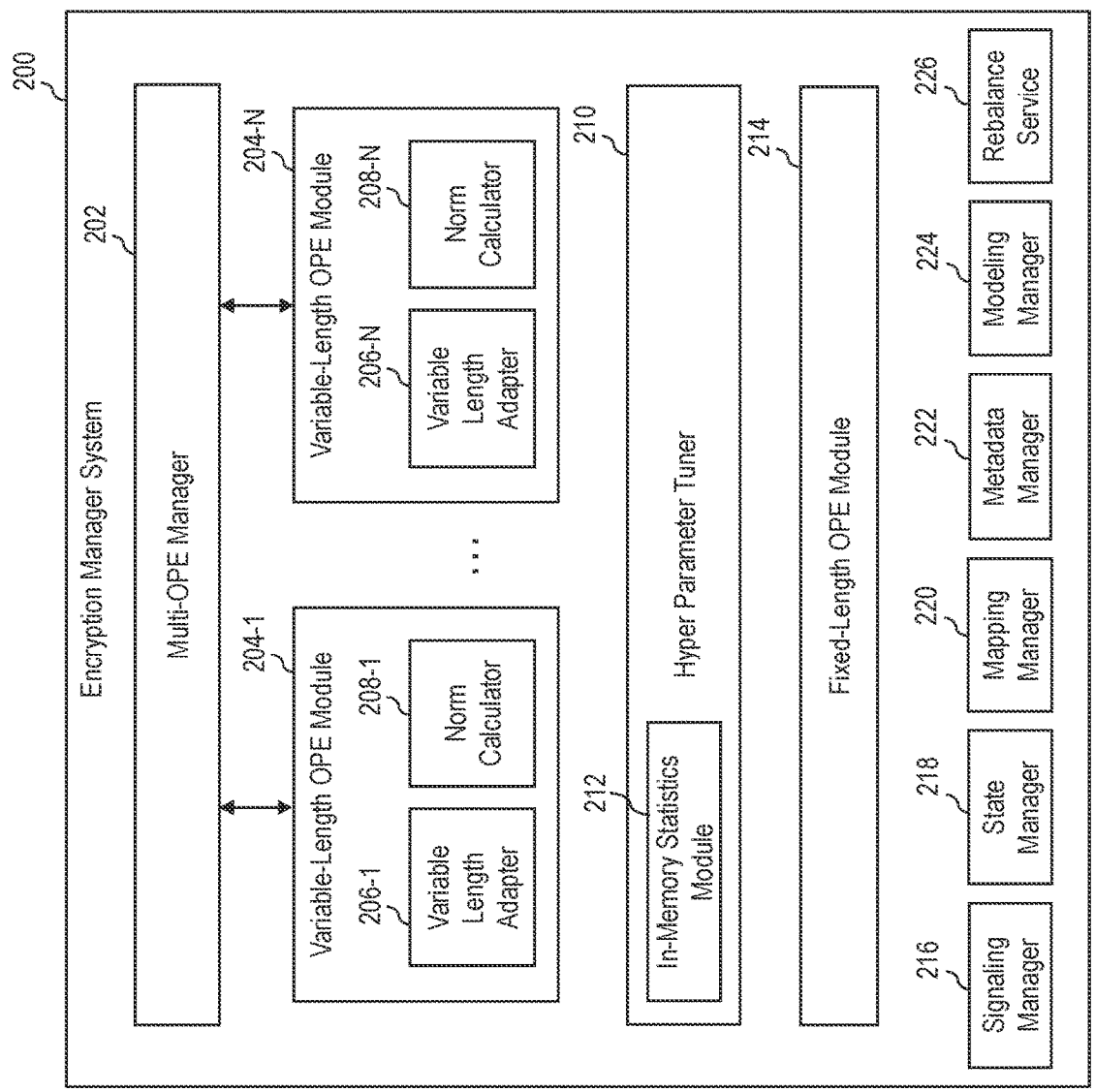
FIG. 2 is a block-diagram of an example architecture for an encryption manager system in accordance with exemplary embodiments.

FIG. 2 is a block-diagram of an example architecture for an encryption manager system 200, which may correspond to the encryption manager system 105, for example.

The encryption manager system 200 includes a multi-OPE manager 202, multiple variable-length OPE modules 204-1 . . . 204-N (referred to collectively herein as variable-length OPE modules 204), a hyperparameter tuner 210, a fixed-length OPE module 214, a signaling manager 216, state manager 218, a mapping manager 220, a metadata manager 222, a modeling manager 224, and a rebalance service 226. The encryption manager system 200, in some embodiments, can be associated with a fully managed, distributed JSON document database architecture (e.g., a Cloudant architecture).

Generally, the signaling manager 216, the state manager 218, the mapping manager 220, the metadata manager 222, the modeling manager 224, and the rebalance service 226 may operate in an expected manner. For example, the state manager 218 manages the state of the OPE scheme and stores it in a database (e.g., the one or more databases 104), and the mapping manager 220 is responsible for mapping how data is mapped to plaintext keys of the encryption scheme. As an example, if the data corresponding to two different documents have the same value for an attribute, then the mapping manager 220 determines whether the two documents will be assigned the same plaintext with respect to the encryption scheme or be assigned different plaintexts. The metadata manager 222 manages the metadata associated with encryption. For example, the metadata may include encryption keys, an encryption algorithm, and the location of the state. If multiple secondary indexes have been defined for given data, then the metadata manager 222 can enable these secondary indexes to have independent encryption keys and encryption algorithms, for example. For an RDBMS, the metadata manager 222 can enable different columns to have different encryption keys and encryption algorithms.

The modeling manager 224 manages the serialization and deserialization of the state into the databases where the cipher texts are stored. The modeling manager 224 also tracks the parts of the state being accessed, their respective mappings, and the number of conflicts. Based on these inputs, the modeling manager 224 may dynamically decide the mapping for new parts of state and dynamically remap existing parts of the state. It is noted that this does not affect other data (e.g., user data). Accordingly, the mapping manager 220 is responsible for converting the user data to OPE plaintext. To do this the mapping manager 220 tracks various parameters including the conversion used for various parts of data, size of the state, and data statistics, for example. When a new user data key needs to be converted, the mapping manager 220 checks these parameters and decides on the conversion.

The fixed-length OPE module 214 assumes the OPE is a fixed-length construction (e.g., a fixed plaintext size and a fixed cipher text size). Accordingly, all cipher texts have the same bit length, and this is required for OPE to correctly work. The cipher texts are eventually stored in at least one database, which supports variable-length data types. As examples, in FoundationDB value is a byte array up to 10 KB, and Db2 provides a varbinary data type, which is a variable-length binary string data type. Thus, in some embodiments, some form of ordering amongst variable-length byte arrays can be present in each database.

A given one of the variable-length OPE modules 204 in the encryption manager system 200 defines an order preserving encryption scheme whose cipher texts are of variable bit length. These variable bit length cipher texts have the property that the cipher texts are order preserving under a specific rule for comparing data of different bit lengths, which can vary from instantiation to instantiation. The comparison rule may be the same as the rule followed by the database system which will eventually be used to store the cipher texts. The variable-length OPE modules 204 may include respective variable length adapters (VLAs) 206-1 . . . 206-N (collectively referred to herein as VLAs 206) and respective norm calculators 208-1 . . . 208-N (collectively referred to as norm calculators 208). The functionality of the VLAs 206 and the norm calculators 208 are discussed in more detail below.

The VLAs 206 bridge the gap between fixed length OPE encryption schemes and the databases that are capable of storing variable-length data. This is accomplished by calling the fixed length OPE encryption scheme with appropriate parameters, which are computed independently for each call to the encrypt function of the fixed length OPE encryption scheme. The logic for using the fixed length OPE encryption scheme to derive variable-length cipher texts which are order preserving is encapsulated in the VLAs 206. The fixed length OPE encryption scheme is unaware of this transformation, which allows, for example, existing fixed length OPE encryption schemes to be used by the VLAs 206.

The parameters which are used by a given one of the VLAs 206 during the call to the fixed length OPE encryption scheme are computed in such a manner so to preserve the IND-OCPA security guarantee of the encryption manager system 200. Each of the VLAs 206 may use only the order of the plain text for its computations, thus ensuring that the encryption manager system 200 remains IND-OCPA compliant.

Cipher texts in a fixed length OPE scheme generally have long bit lengths in order to reduce mutations. The optimal bit length of the cipher text which will reduce or eliminate mutations depends on the data that will be encrypted and the order in which the data will be encrypted. Since this information is not available initially, a fixed length OPE scheme is instantiated with the cipher text having a length that is exponential to a length of the plain text in order to guarantee no mutation. However, this is infeasible in practical scenarios. Another option is to set the bit length of the cipher text to be equal to the maximum size of data supported by the underlying database that will eventually be used to store the cipher text. This option minimizes the number of mutations for a fixed length OPE scheme but results in impractical overheads (e.g., an overhead of 1280 times is needed for encrypting and storing a four-byte integer in FoundationDB).

Accordingly, in some embodiments, a given one of the VLAs 206 starts with a cipher text having a small size and then increases the cipher text size (of a subset of data that is encrypted) as needed to reduce a number of mutations in the encryption manager system 200. This has the advantage of ensuring that storage overhead due to variable-length OPE is kept at a minimum, while also reducing the number of mutations encountered by the encryption manager system 200.

Consider a situation where the encryption manager system 200 needs to encrypt some data, x, which has not been previously encrypted. In some embodiments, a given one of the VLAs 206 can retrieve the maximum OPE assigned to plaintext that is less than x (denoted x_prev_ope) and the minimum OPE assigned to plaintext that is greater than x (denoted x_next_ope). The x_prev_ope and x_next_ope can be retrieved from the state maintained by the OPE for cases where the given VLA 206 is OPE specific, or by using a fixed-length OPE and querying a user database, where the given VLA 206 is OPE agnostic.

The OPE length for data x is computed based on a function of x_prev_ope and x_next_ope, which may be expressed as x_ope_length=F(x_prev_ope, x_next_ope). The function in some embodiments, determines if the bit length of x_prev_ope is equal to the bit length of x_next_ope. If they are equal, then the bit length for x_prev_ope is returned if space is available for a new cipher text. If not, then the bit length of x (the return value) is set to the bit length of x_prev_ope and is incremented by a number of bytes, where the number of bytes is specified (e.g., via a configuration parameter). If the bit length of x_prev_ope is not equal to the bit length of x_next_ope, then x_prev_ope and x_next_ope are set to the same bit length. This is done by transforming the value out of x_prev_ope and x_next_ope having the lower cipher text bit length. This transformation is done in accordance with the comparison rule of the underlying database which will be used for storing the cipher text. In one example embodiment, the lower bit length value is prepended with an appropriate number of zeroes to make its length the same as the length of the other value. The function is then recursively performed to compute the OPE length of x.

The process then includes instantiating and calling an instance of a fixed length OPE with x_ope_length as the cipher text length to obtain x_ope. The process then returns x_ope to the caller.

For OPE, a function is used for selecting the cipher text from an available range. For example, x_ope is selected given x_prev_ope and x_next_ope. Such a function effects when and how many mutations will be encountered. OPE implementations have a defined way of choosing cipher text, which may be calculated as a midpoint of x_prev_ope and x_next_ope, for example. One or more embodiments described herein modify, for example, existing OPE implementations so that the OPE chooses cipher text based on a normalization ("norm") parameter. The value of the norm parameter is referred to herein as norm. A given norm, in some embodiments, is calculated by one of the norm calculators 208. A norm is specified while encrypting a value. In embodiments that require selecting a midpoint of x_prev_ope and x_next_ope as x_ope, a norm may be equal to 0.5. The optimal norm for a given encryption is data dependent, including the data that will be encrypted after this encryption.

A given one of the norm calculators 208 can calculate the norm for each encryption independently. The optimal value of norm for each encryption depends not only on the data that has been encrypted till now but also on the data that will be encrypted in future. Since the future encryptions are not known in advance, the norm calculator 208 may use implicit statistics to compute the norm value for each encryption. The implicit statistics correspond to the OPE assigned to the neighbors of the current plain text being encrypted (data x). As an example, the implicit statistics may comprise a reverse sorted list of cipher text assigned to plaintext less than x, which can be called "history left," and a sorted list of cipher text assigned to plaintext greater than x can be called "history right." The implicit statistics can be retrieved from the state maintained by the OPE for cases where the variable-length OPE modules 204 are OPE specific, or by using a fixed-length OPE and querying a user database, where the variable-length OPE modules 204 are OPE agnostic.

For example, the norm computation can be different for each encryption operation as the implicit statistics are different for each encryption. The norm computation also adapts to different workloads as the implicit statistics depend on the workload, and the same data inserted in a different order will produce a different norm trail. A norm trail refers a list of norm values that were used as parameters for a given call to the encrypt function. If the same set of values are inserted in two different orders, then it is possible that the value of norm used for encrypting a value in insert order 1 is different from the norm value used for encrypting the same value in insert order 2.

In some examples, the norm computation is performed in such a manner such to maintain the security guarantee (e.g., IND-OCPA) of the system. In such embodiments, the norm computation uses only the order information from the implicit statistics, as described in more detail below.

An example of a process for varying OPE parameters in accordance with one or more embodiments is now described. Assume that encryption manager system 200 needs to encrypt some data, x, and computes the OPE length for x (x_ope_length) using a given one of the VLAs 206, as described in more detail elsewhere herein. Next, the norm is computed by a corresponding one of the norm calculators 208. More specifically, the norm calculator 208 can obtain, as inputs, a history size indicating how much historical data is to be considered and a history weight to be assigned to the historical data. The norm calculator 208 then retrieves the history left up to the history size and the history right up the history size. The norm is computed as a function of the history left, history right, and history weight. A fixed-length OPE module (e.g., corresponding to fixed-length OPE module 214) is instantiated and called with the x_ope_length and calculated norm to obtain x_ope.

The history left and history right can be obtained either by querying the user database, where the variable-length OPE modules 204 are OPE agnostic or by accessing the state maintained by the OPE for case where the variable-length OPE modules 204 are OPE specific. A parameter length is computed as the maximum length of OPE cipher text in history right and history left. Then two parameters, leftDensity (which represents the density of OPE cipher text in the history left) and rightDensity (which represents the density of OPE cipher text in history right) are computed. As an example, the density parameters may be calculated using the following function:

$$\text{length} - \log\left(\frac{\text{high } \textit{ope} - \text{low } \textit{ope}}{\#\text{Values}}\right),$$

which normalizes the density when variable-length encoding is used. High ope and low ope are the maximum and minimum OPE cipher text in the history whose density is being computed and #values is the number of elements in the corresponding history. The process may further include determining a difference in the density parameters (referred to as densityDiff) using the following equation:

$$\frac{\textit{leftDensity} - \textit{rightDensity}}{\textit{maxDensityDiff}},$$

which splits the region between low ope and high ope into (leftDensity−rightDensity) slots. maxDensityDiff in this equation refers to the maximum possible difference between the history right and history left in the current instantiation of OPE. The norm can be calculated as follows:

$$densityDiff^{\left(\frac{maxCtLength-length}{maxCtLength}\right)historyWeight},$$

where the norm determines how far the cipher text for the current encryption will be from the midpoint. The encoding or OPE cipher text can be set to (low ope+N/2)+(N/2*norm), where N=high ope−low ope. In this example, (low ope+N/2) corresponds to the midpoint, and (N/2*norm) corresponds to the distance from the midpoint based on the norm.

The hyperparameter tuner 210 includes an in-memory statistics module 212 that maintains statistics about data that has been encrypted up to the present time. The statistics are used for tuning the parameters used by the variable-length OPE modules 204, including for example, history size and/or history weight. The statistics can be used to infer the type of workload (e.g., a sequential workload or a uniform workload). Also in some embodiments, the statistics are used to create a time-series series model that can predict future inserts, which are then used to tune the parameters. By way of example, if sequential inserts are present, then the historical data should have more weight; if uniform inserts are present, then historical data should be given less weight; if bit lengths of the cipher text assigned are increasing, then more weight should be given to the historical data; and if there is high variance in the density of history left and history right (e.g., based on one or more thresholds), then the history size should be increased.

In some implementations, multiple independent encryption manager systems 200 can be hosted on different servers (e.g., for load balancing), and each such system can maintain its own in-memory statistics. The statistics from the servers can be aggregated periodically to improve the parameter tuning.

By way of example, each server can maintain minimum value and maximum value pairs (denoted as [min_value, max_value]) for the previous k inserts, and m additional [min_value, max_value] pairs for the previous: k−1 to 2k inserts, 2k−1 to 3k inserts, . . . , (m−1)k−1 to mk inserts. The minimum and maximum values across the m entries can be used to change the history weight. The history weight can be changed according to one or more rules or criteria. For example, if the variance of the minimum and maximum values is within a particular threshold, then the history weight can be kept substantially constant, and the history weight can be incremented if the variance is increasing or decreasing.

The combination of variable-length cipher texts, variable OPE parameters, and hyperparameter tuning, in accordance with embodiments described herein, can substantially reduce mutations, however, it is still possible to have one or more mutations in a worst-case scenario. It is noted that if OPE is IND-OCPA compliant, then mutations cannot be eliminated from the OPE itself.

Mutations are further eliminated, in some embodiments, using the multi-OPE manager 202. Generally, the multi-OPE manager 202 uses multiple independent OPE instances (e.g., corresponding to variable-length OPE modules 204). The cipher text output from each instance is order preserving, and in some embodiments, it is assumed there are no guarantees that cipher text will be order preserving across the OPE instances. The multi-OPE manager 202 identifies the OPE instance corresponding to each cipher text using the additional data or metadata that is stored in the one or more databases 104. As examples, separate namespaces can be maintained in FoundationDB for each OPE instance and an extra column can be maintained to specify the identifier of OPE instance in an RDBMS (such as Db2). The data that is returned to the caller of encryption function can include the cipher text (x_ope) and the identifier (x_ope_id).

In at least some embodiments, a range query operation now becomes a union of ranges along with their associated ope_ids. For example, consider a user query specifying that x is between 10 and 50. The user query is then transformed, where the actual transformation depends on the underlying data store. For example, the transformed user query can be: (x_ope between 1010 and 1500 and ope_id=1) OR (x_ope between 100 and 150 and ope_id=2). The variable-length cipher text and varying OPE parameters may be implemented for each OPE instance, and the hyperparameter can be tuned across the OPE instances (as is the case in the FIG. 2 embodiment). Also, in some embodiments, one or more of the OPE instances can be merged in order to improve performance. For example, merging the OPE instances may include merging two sorted lists, which is optionally performed during a maintenance window. The merging of two OPE instances is generally equivalent to merging two sorted lists (since each OPE instance can return its ciphertexts in sorted order). The merging of OPE instances can lead to mutation in user data and can be performed during a regular maintenance window.

Figure 3:
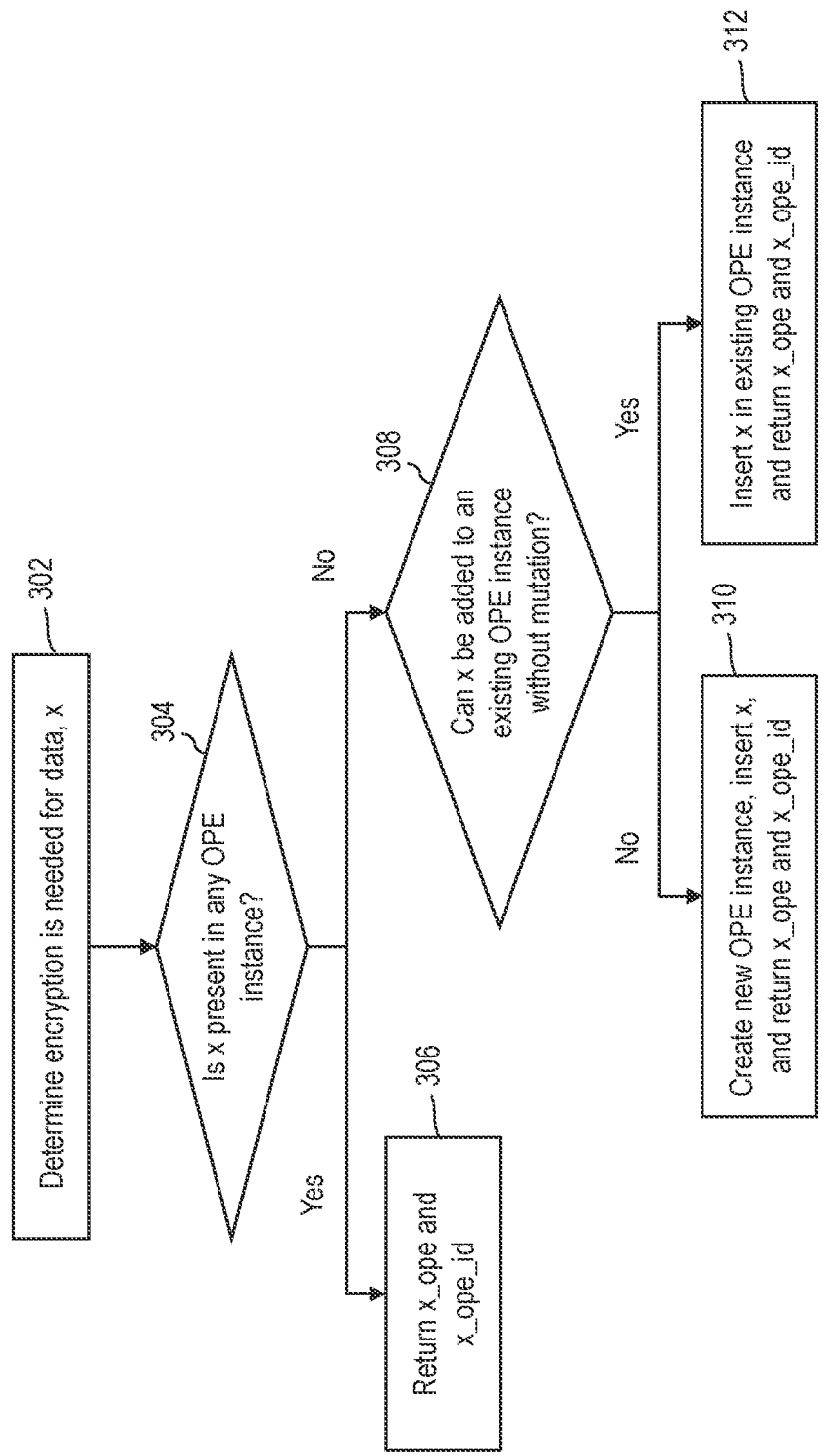
FIG. 3 shows an example of a process for managing multiple OPE instances in accordance with exemplary embodiments.

FIG. 3 shows an example of a process for managing multiple OPE instances in accordance with exemplary embodiments. The process depicted in FIG. 3 may be performed by the multi-OPE manager 202, for example. Step 302 includes determining encryption is needed for some data, x, and step 304 includes a test to determine whether x is present in any OPE instance. If yes, then step 306 includes returning x-ope and x_ope_id. If no, then step 308 includes a test to determine if x can be added to an existing OPE instance without mutation. If no, then step 310 includes creating a new OPE instance, inserting x into the new OPE instance, and returning x_ope and x_ope_id. If yes, then step 312 includes inserting x into the existing OPE instance and returning x_ope and x_ope_id.

An example of a process performed by multi-OPE manager 202 for processing a range query also can include converting the low value of the range (q_low) and converting the high value of range of the query (q_high) by iterating over each of the variable-length OPE modules 204 to obtain the transformation of q_low and q_high. The transformation of q_low and q_high along with an identifier of the associated OPE instance is added as a conjunction to the transformed range query.

Figure 4:
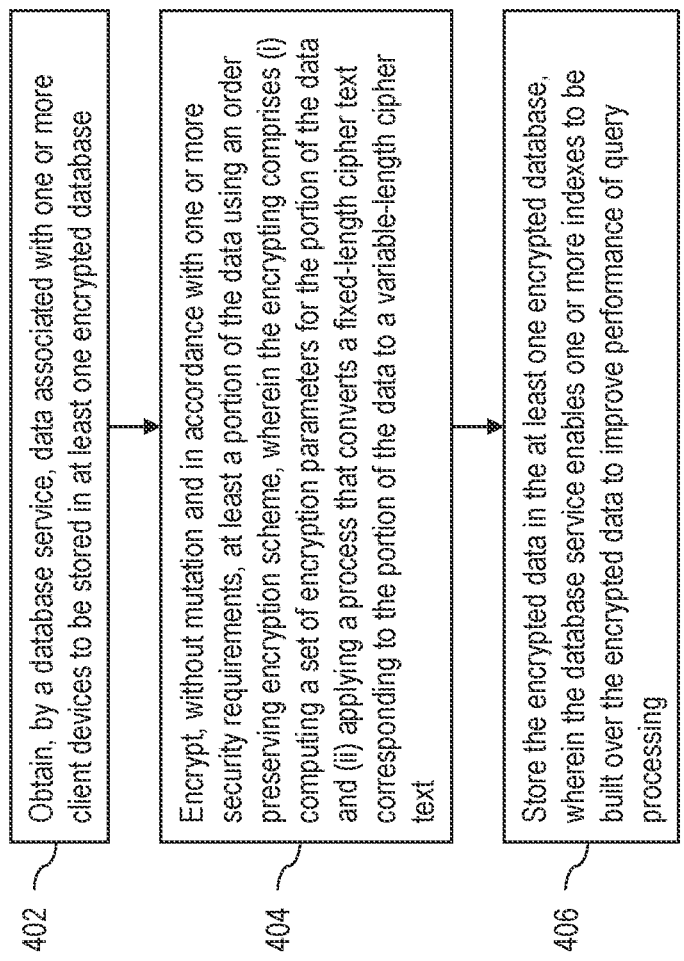
FIG. 4 is a flow diagram illustrating techniques in accordance with exemplary embodiments.

FIG. 4 is a flow diagram illustrating techniques in accordance with exemplary embodiments. Step 402 includes obtaining, by a database service, data associated with one or more client devices to be stored in at least one encrypted database. Step 404 includes encrypting, without mutation and in accordance with one or more security requirements, at least a portion of the data using an order preserving encryption scheme, wherein the encrypting comprises (i) computing a set of encryption parameters for the portion of the data and (ii) applying a process that converts a fixed-length cipher text corresponding to the portion of the data to a variable-length cipher text. Step 406 includes storing the encrypted data in the at least one encrypted database, wherein the database service enables one or more indexes to be built over the encrypted data to improve performance of query processing.

The process may include a step of maintaining, by the database service, statistics corresponding to previously encrypted data over one or more time periods. The maintaining may include maintaining statistics for predicting data that will be inserted in the at least one encrypted database over one or more future time periods, wherein the predicted data is based at least in part on a time-series model that is generated using the statistics corresponding to previously encrypted data. Computing the set of encryption parameters for the portion of the data may include computing a normalization parameter, wherein the normalization parameter determines a cipher text length to be used for the portion of the data based at least in part on a first list of cipher text lengths assigned to data larger than the portion of the data and a second list of cipher text lengths assigned to data smaller than the portion of the data. The normalization parameter may be computed based at least in part on a first hyperparameter indicating an amount of previously encrypted data to be considered and a second hyperparameter indicating an amount of weight given to the previously encrypted data. The process may include the following steps: inferring at least one of: a type of workload determined based on the statistics; an amount of variance of maximum cipher text lengths between the one or more time periods; and an amount of variance of minimum cipher text lengths between the one or more time periods; and dynamically adjusting, by the database service, at least one of the first and second hyperparameters based on the inferring. The process may include a step of executing, by the database service, multiple independent order preserving encryption instances that simultaneously encrypt data corresponding to a single column of the at least one encrypted database. The process may include a step of triggering a new order preserving encryption instance in response to determining that none of the multiple independent order preserving encryption instances can encrypt the portion of the obtained data without mutation. A maximum number of the multiple independent order preserving encryption instances may be less than a number of unique elements encrypted. The process may include the following steps: processing a range query of a user by transforming the range query independently for each of the multiple independent order preserving encryption instances; and adding transformations resulting from the multiple independent order preserving encryption instances to the transformed range query. The one or more security requirements may correspond to indistinguishability under ordered chosen plaintext attack requirements.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
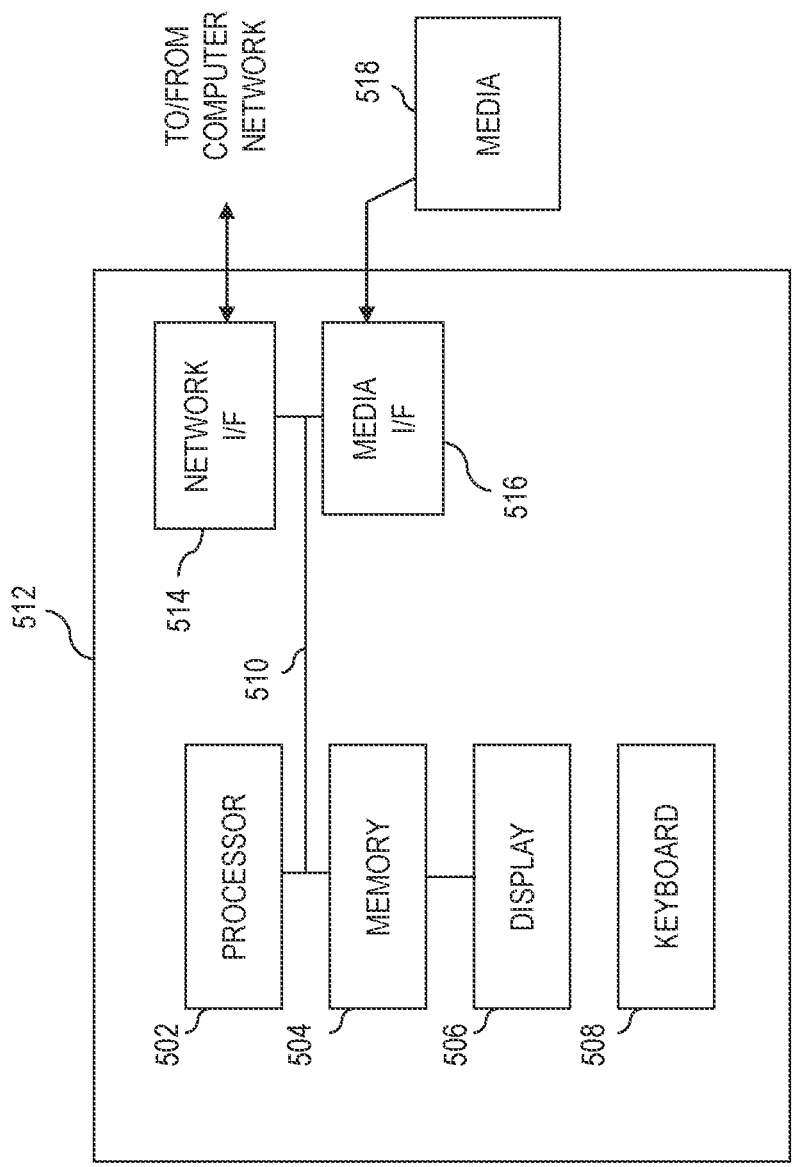
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
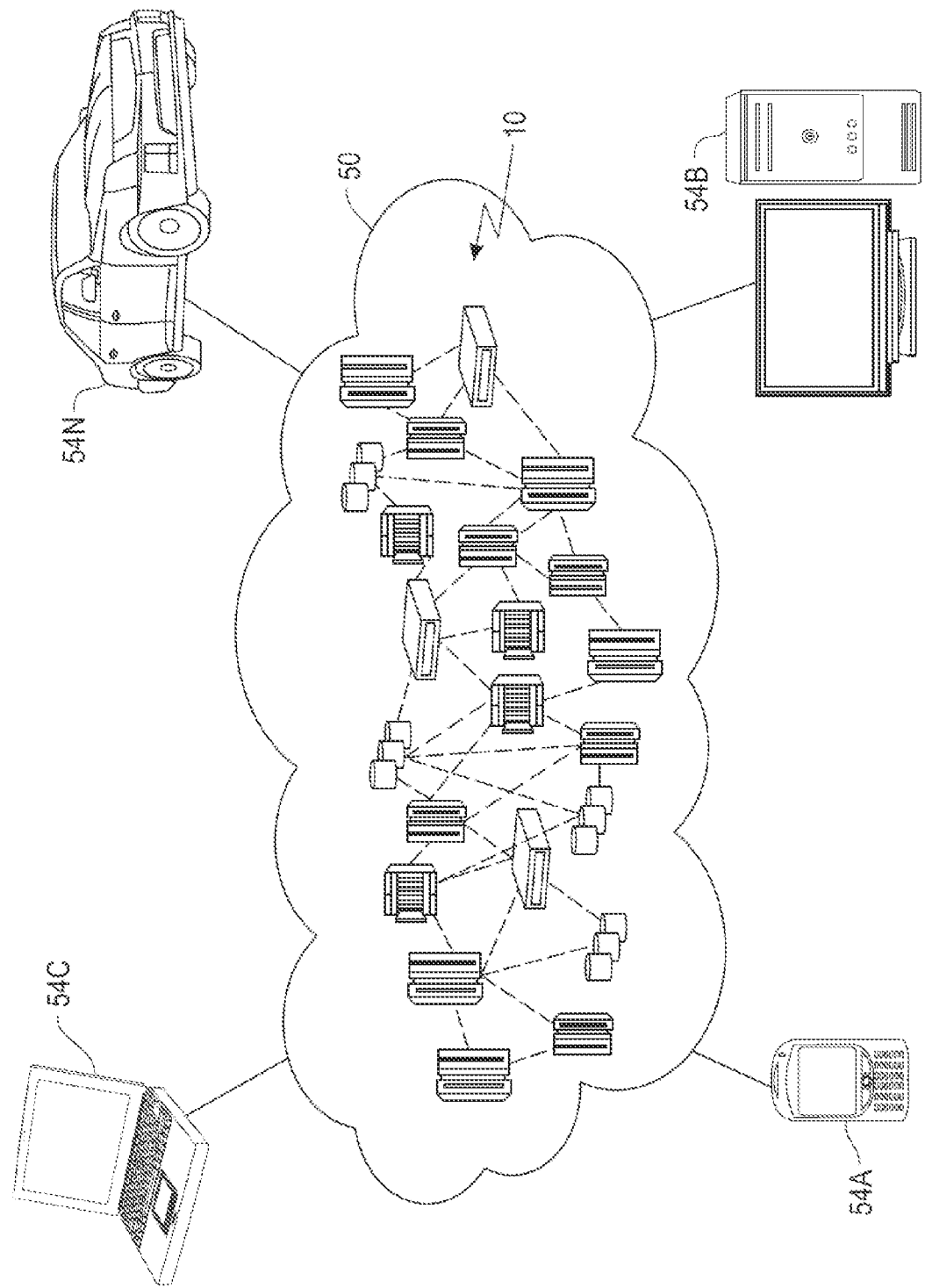
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
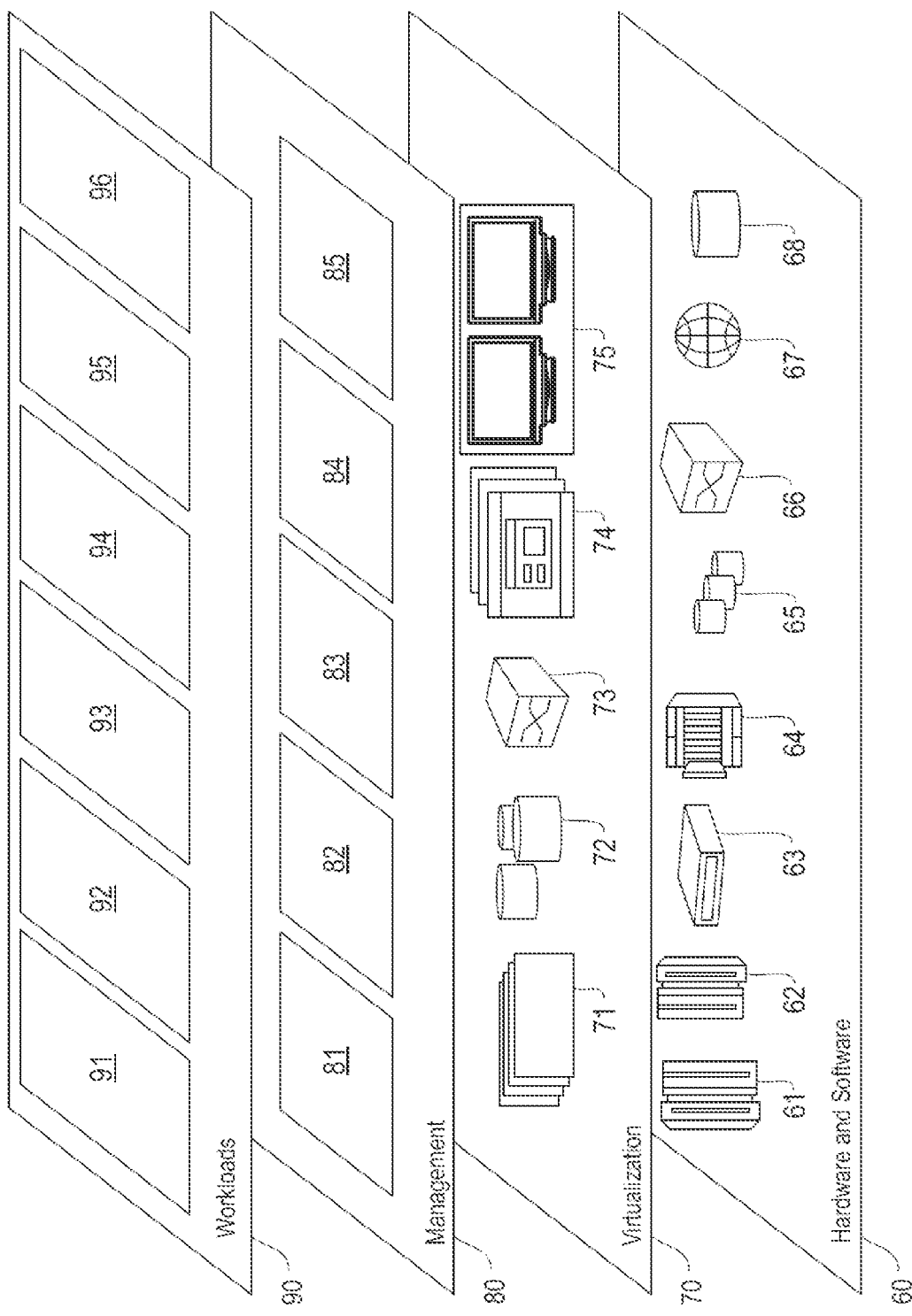
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a secure database-as-a-service 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as providing improvements to the performance and security of DBaaS systems by, for example, enabling support for variable-length cipher texts, substantially eliminating or reducing mutations, and ensuring security guarantees.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining, by one or more servers of a database service, data associated with one or more client devices to be stored in at least one database using a variable-length data type;
    computing a length of a cipher text to be used for encrypting at least a portion of the data;
    computing a normalization parameter for the portion of the data based at least in part on statistics corresponding to previously encrypted data stored in the at least one database;
    executing, by the database service, an instance of an order preserving encryption process that uses the normalization parameter to select a fixed-length cipher text corresponding to the portion of the data; and
    storing the cipher text corresponding to the portion of the data in the at least one database using the variable-length data type, wherein the length of the cipher text is different than the length of at least one other cipher text stored in the at least one database by the database service;
    wherein the method is carried out by at least one computing device.

2. The computer-implemented method of claim 1, comprising:
    maintaining, by the database service, the statistics corresponding to the previously encrypted data over one or more time periods.

3. The computer-implemented method of claim 2, wherein the maintaining comprises:
maintaining statistics for predicting data that will be inserted in the at least one encrypted database over one or more future time periods, wherein the predicted data is based at least in part on a time-series model that is generated using the statistics corresponding to previously encrypted data.

4. The computer-implemented method of claim 2, wherein the normalization parameter is based at least in part on a first list of cipher text lengths assigned to data larger than the portion of the data and a second list of cipher text lengths assigned to data smaller than the portion of the data, wherein the normalization parameter corresponds to a distance from a midpoint of an available cipher text range that is used for selecting the cipher text for the portion of the data.

5. The computer-implemented method of claim 4, wherein the normalization parameter is computed based at least in part on a first hyperparameter indicating an amount of previously encrypted data to be considered and a second hyperparameter indicating an amount of weight given to the previously encrypted data.

6. The computer-implemented method of claim 5, comprising:
inferring at least one of:
a type of workload determined based on the statistics;
an amount of variance of maximum cipher text lengths between the one or more time periods; and
an amount of variance of minimum cipher text lengths between the one or more time periods; and
dynamically adjusting, by the database service, at least one of the first and second hyperparameters based on the inferring.

7. The computer-implemented method of claim 1, comprising:
executing, by the database service, multiple independent order preserving encryption instances that encrypt data corresponding to a single column of the at least one encrypted database.

8. The computer-implemented method of claim 7, wherein the instance of the order preserving encryption process used to select the fixed-length cipher text corresponding to the portion of the obtained data is triggered in response to determining that none of the multiple independent order preserving encryption instances can encrypt the portion of the obtained data without mutation.

9. The computer-implemented method of claim 7, wherein a maximum number of the multiple independent order preserving encryption instances is less than a number of unique elements encrypted.

10. The computer-implemented method of claim 7, comprising:
processing a range query of a user by transforming the range query independently for each of the multiple independent order preserving encryption instances; and
adding transformations resulting from the multiple independent order preserving encryption instances to the transformed range query.

11. The computer-implemented method of claim 1, wherein the database service encrypts the portion of the data in accordance with indistinguishability under ordered chosen plaintext attack security requirements.

12. The computer-implemented method of claim 1, wherein software is provided as a service in a cloud environment to perform the database service.

13. A computer program product comprising a computer readable storage medium having program instructions embodied therewith, the program instructions executable by a computing device to cause the computing device to:
obtain, by one or more servers of a database service, data associated with one or more client devices to be stored in at least one database using a variable-length data type;
compute a length of a cipher text to be used for encrypting at least a portion of the data;
compute a normalization parameter for the portion of the data based at least in part on statistics corresponding to previously encrypted data stored in the at least one database;
execute, by the database service, an instance of an order preserving encryption process that uses the normalization parameter to select a fixed-length cipher text corresponding to the portion of the data; and
store the cipher text corresponding to the portion of the data in the at least one database using the variable-length data type, wherein the length of the cipher text is different than the length of at least one other cipher text stored in the at least one database by the database service.

14. The computer program product of claim 13, wherein the program instructions executable by a computing device cause the computing device to:
maintain, by the database service, the statistics corresponding to the previously encrypted data over one or more time periods.

15. The computer program product of claim 14, wherein the maintaining comprises:
maintaining statistics for predicting data that will be inserted in the at least one encrypted database over one or more future time periods, wherein the predicted data is based at least in part on a time-series model that is generated using the statistics corresponding to previously encrypted data.

16. The computer program product of claim 14, wherein the normalization parameter is based at least in part on a first list of cipher text lengths assigned to data larger than the portion of the data and a second list of cipher text lengths assigned to data smaller than the portion of the data, wherein the normalization parameter corresponds to a distance from a midpoint of an available cipher text range that is used for selecting the cipher text for the portion of the data.

17. The computer program product of claim 16, wherein the normalization parameter is computed based at least in part on a first hyperparameter indicating an amount of previously encrypted data to be considered and a second hyperparameter indicating an amount of weight given to the previously encrypted data.

18. The computer program product of claim 17, wherein the program instructions executable by a computing device cause the computing device to:
infer at least one of:
a type of workload determined based on the statistics;
an amount of variance of maximum cipher text lengths between the one or more time periods; and
an amount of variance of minimum cipher text lengths between the one or more time periods; and
dynamically adjust, by the database service, at least one of the first and second hyperparameters based on the inferring.

19. The computer program product of claim 13, wherein the database service encrypts the portion of the data in accordance with indistinguishability under ordered chosen plaintext attack security requirements.

20. A system comprising:
a memory configured to store program instructions;
a processor operatively coupled to the memory to execute the program instructions to:
obtain, by one or more servers of a database service, data associated with one or more client devices to be stored in at least one database using a variable-length data type;
compute a length of a cipher text to be used for encrypting at least a portion of the data;
compute a normalization parameter for the portion of the data based at least in part on statistics corresponding to previously encrypted data stored in the at least one database;
execute, by the database service, an instance of an order preserving encryption process that uses the normalization parameter to select a fixed-length cipher text corresponding to the portion of the data; and
store the cipher text corresponding to the portion of the data in the at least one database using the variable-length data type, wherein the length of the cipher text is different than the length of at least one other cipher text stored in the at least one database by the database service.

* * * * *